(12) United States Patent
O'Kelley et al.

(10) Patent No.: US 11,188,401 B2
(45) Date of Patent: *Nov. 30, 2021

(54) REAL-TIME DATA PROCESSING PIPELINE AND PACING CONTROL SYSTEMS AND METHODS

(71) Applicant: Xandr Inc., New York, NY (US)

(72) Inventors: Charles Brian O'Kelley, New York, NY (US); Catherine Mary Williams, Seattle, WA (US); Taylor Edward Burmeister, Brooklyn, NY (US); Yaron Lissack, Great Neck, NY (US); Justin Pines, New York, NY (US); Samuel Seljan, Portland, OR (US); Jaidev Sridhar, New York, NY (US)

(73) Assignee: Xandr Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/077,472

(22) Filed: Oct. 22, 2020

(65) Prior Publication Data

US 2021/0042175 A1 Feb. 11, 2021

Related U.S. Application Data

(63) Continuation of application No. 16/037,621, filed on Jul. 17, 2018, now Pat. No. 10,824,487.

(51) Int. Cl.
*G06F 13/10* (2006.01)
*G06F 9/54* (2006.01)
(Continued)

(52) U.S. Cl.
CPC .............. *G06F 9/546* (2013.01); *G06F 9/466* (2013.01); *G06F 9/4881* (2013.01)

(58) Field of Classification Search
CPC .......... G06F 9/546; G06F 9/466; G06F 9/4881
See application file for complete search history.

(56) References Cited

U.S. PATENT DOCUMENTS

2005/0193414 A1* 9/2005 Horvitz .............. H04N 21/4335
725/46
2014/0229268 A1 8/2014 Clapp et al.
(Continued)

OTHER PUBLICATIONS

PCT/US19/42137 International Search Report and Written Opinion dated Oct. 25, 2019, pp. 1-10.
(Continued)

*Primary Examiner* — Doon Y Chow
*Assistant Examiner* — Abdou K Seye
(74) *Attorney, Agent, or Firm* — Guntin & Gust, PLC; Atanu Das

(57) ABSTRACT

A data processing system includes a transaction bus, a console application in communication with the transaction bus, and a view predictor subsystem in communication with the transaction bus. The transaction bus receives, from a user application executing on a client device, a call for visual information to be provided to the user application. The view predictor subsystem determines a likelihood that the visual information will be viewable within a viewport of the user application, and a plurality of respective values for a plurality of sources of the visual information are computed based on the likelihood and a respective priority for each source. The console application provides to the transaction bus the set of potential sources of the visual information, and the transaction bus selects, based on the computed values, one of the potential sources of the visual information to be the result, which is provided to the user application.

20 Claims, 8 Drawing Sheets

(51) Int. Cl.
  *G06F 9/48*   (2006.01)
  *G06F 9/46*   (2006.01)

(56) References Cited

U.S. PATENT DOCUMENTS

| | | |
|---|---|---|
| 2015/0007101 A1 | 1/2015 | Lewis et al. |
| 2015/0213509 A1 | 7/2015 | Musumeci |
| 2016/0042407 A1* | 2/2016 | Els ............... G06Q 30/0275 705/14.71 |
| 2016/0162955 A1 | 6/2016 | O'kelley et al. |
| 2016/0227297 A1 | 8/2016 | Bennett et al. |
| 2016/0371745 A1 | 12/2016 | Lidow et al. |
| 2017/0161774 A1 | 6/2017 | Gorsline et al. |
| 2017/0316445 A1 | 11/2017 | Karlsson |
| 2018/0136992 A1* | 5/2018 | Solinger ............ G06Q 30/0275 |
| 2020/0026588 A1 | 1/2020 | O'kelley et al. |
| 2020/0051117 A1* | 2/2020 | Mitchell .............. G06Q 20/387 |
| 2020/0273495 A1* | 8/2020 | Baughman ......... H04N 21/8456 |
| 2021/0021491 A1* | 1/2021 | Pasha .................. H04L 41/069 |

OTHER PUBLICATIONS

PCT/US2019/042137 International Preliminary Report on Patentability, dated Jan. 28, 2021, pp. 1-7.

* cited by examiner

REAL-TIME DATA PROCESSING PIPELINE AND PACING CONTROL SYSTEMS AND METHODS

CROSS REFERENCE TO RELATED APPLICATIONS

This application is a continuation of U.S. patent application Ser. No. 16/037,621 (now U.S. Pat. No. 10,824,487) filed on Jul. 17, 2018. The contents of each of the foregoing is/are hereby incorporated by reference into this application as if set forth herein in full.

TECHNICAL FIELD

The present disclosure relates generally to data processing and control architectures and, more particularly, to a real-time data and message processing system and corresponding pacing control methods.

BACKGROUND

Data processing and storage systems that have to address thousands of simultaneous transactions within tens or hundreds of milliseconds face substantial challenges in scaling while keeping latency at a minimum. These difficulties increase when the results of data processing operations depend on data that is continuously collected from many remote clients. Accordingly, there is a need to provide real-time data processing systems with high-performance data storage and streaming architectures that address the unique problems arising in these types of systems at large scales.

BRIEF SUMMARY

In one aspect, a computer-implemented method comprises the steps of: providing a data processing system comprising (i) a transaction bus, (ii) a console application in communication with the transaction bus, (iii) and a view predictor subsystem in communication with the transaction bus; receiving, at the transaction bus from a user application executing on a client device, a call for visual information to be provided to the user application; in substantially real-time, prior to returning a result to the user application in response to the call for visual information: determining, by the view predictor subsystem, a likelihood that the visual information will be viewable within a viewport of the user application; computing a plurality of respective values for a plurality of sources of the visual information based on the likelihood and a respective priority for each source; providing, by the console application to the transaction bus, the set of potential sources of the visual information; and selecting, by the transaction bus, based on the computed values, one of the potential sources of the visual information to be the result; and providing the result, by the transaction bus, to the user application. Other aspects of the foregoing include corresponding systems and computer-executable instructions stored on non-transitory storage media.

In one implementation, the data processing system further comprises a publish/subscribe and message queueing subsystem, and the performed operations further include: receiving, at the publish/subscribe and message queueing subsystem, a real-time stream of transactions; creating a job to aggregate data from the real-time stream of transactions with data from one or more other streams received at the publish/subscribe and messaging queueing subsystem; and executing the job and receiving the aggregated data resulting from the execution of the job at the publish/subscribe and message queueing subsystem; providing at least a portion of the aggregated data as input to a control loop feedback process; and executing the control loop feedback process using the input and generating a pacing result from the execution.

Various implementations can include any of the following features. The pacing result can be applied to one or more of the computed values. Executing the control loop feedback process can include executing the control loop feedback process at a first time to generate the pacing result. Additional jobs can be periodically created and executed to aggregate data received from the streams. The pacing result and at least a portion of the aggregated data from the additional jobs can be provided as input to the control loop feedback process at a second, later time to generate an updated pacing result. Computing a particular value can include calculating a value that meets a specified goal for providing visual information to user applications. The visual information can include an image or a video.

In another implementation, the performed operations further include tracking over time, for a plurality of visual information items provided to a plurality of user applications, historical viewability information indicating whether the visual information items were viewable in respective viewports of the plurality of user applications; and providing, by the message queueing subsystem to the view predictor subsystem, the historical viewability information, wherein the view predictor subsystem determines the likelihood that the visual information will be viewable within a viewport of the user application based on the historical viewability information.

The performed operations can also include providing, by the transaction bus to the user application, in response to the call for visual information, software code for execution on the client device, the software code configured to determine when the visual information is viewable within the viewport of the user application.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
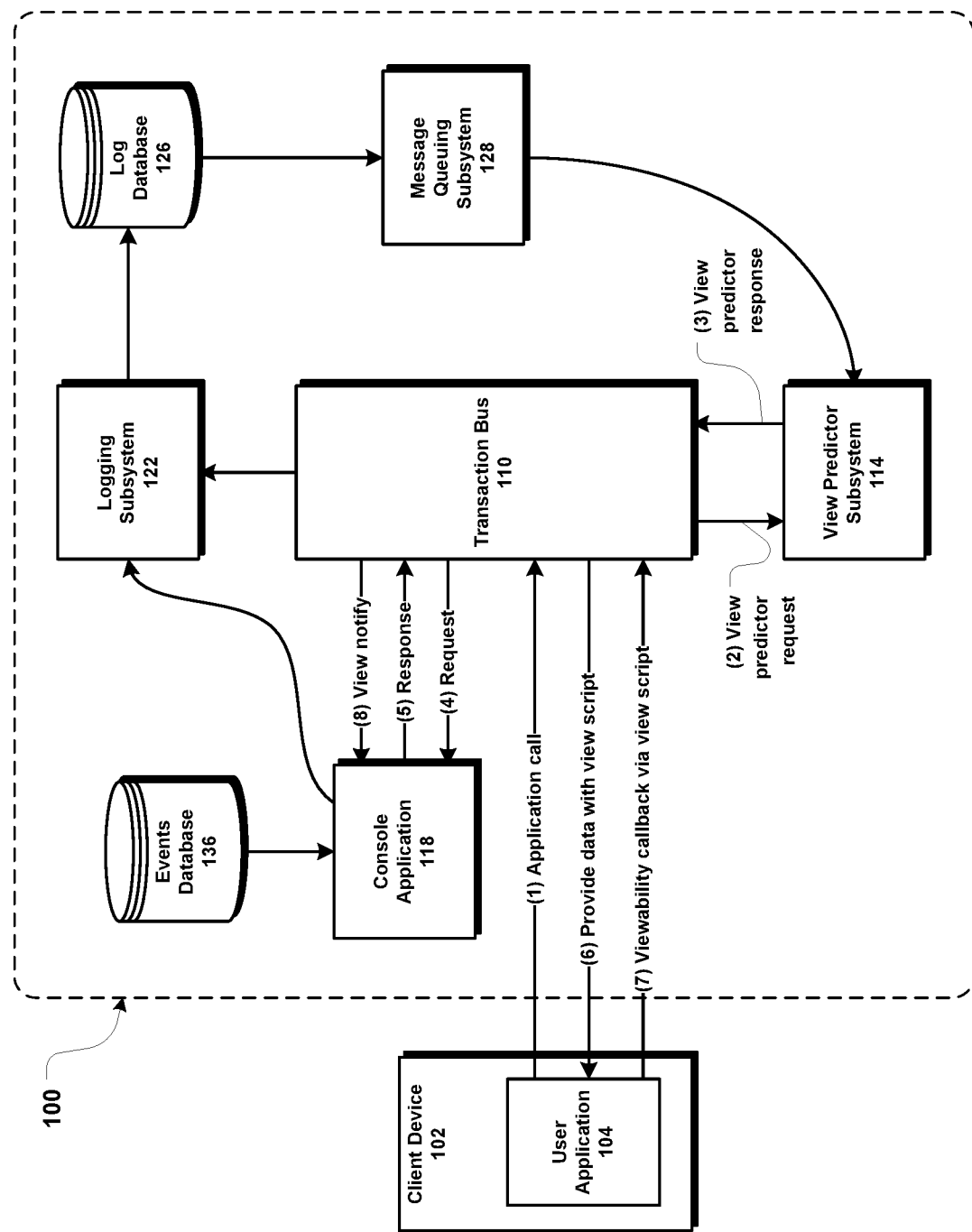
FIG. 1 depicts an example high-level system architecture for real-time data processing pipelines according to an implementation.

FIG. 1 depicts an example high-level system 100 including a real-time data processing pipeline architecture, according to one implementation. A client device 102, such as a smartphone, laptop, desktop computer, tablet, or other computing device, executes a user application 104, such as a web browser or desktop or mobile operating system native application. Upon occurrence of an event on the client device 102 (e.g., opening user application 104, browsing to a webpage within user application 104, etc.), user application 104 makes a call, over a network (e.g., the internet, mobile phone network, etc.), to transaction bus 110 within the system 100. The call can include a request for data, for example, a request to receive visual information such as an image or video.

Transaction bus 110 executes on one or more physical servers within one or more data centers, and interfaces with various components within system 100 to cause the performance of real-time data processing operations in response to the call made by user application 104. For example, in response to the call, transaction bus 110 makes a request to view predictor subsystem 114 and receives a response in return. As further described below, view predictor subsystem 114 can determine the likelihood that the data requested by user application 104 will be viewable to a user. For example, in the case of the data comprising an image and the user application 104 being a web browser, view predictor subsystem 114 predicts whether the image will appear at some point within the browser's viewport (the area within application 104 visible to a user), whether as a result of being displayed immediately within the viewport or at a later time when the user scrolls down, for example.

Transaction bus 110 makes the viewability likelihood received from view predictor subsystem 114 available to console application 118, which uses the information as input to its decision-making logic. Console application 118 can retrieve additional data inputs for use in its logic from events database 136. In one implementation, console application 118 includes individual bidders that are configured as software and/or hardware-based operators that execute bidding logic in online advertising auctions. Such bidders can run on computing devices each having one or more processors and memories to store computer-executable instructions executable by the processor. In such an implementation, transaction bus 110 makes a request to console application 118 for bids to serve a creative to the user of user application 104 in an ad auction and provides the viewability likelihood in the request. The bidders have bidding logic that can take the viewability likelihood into account (along with, e.g., information about the user, client device 102, and other targeting information) when calculating a bid price, which is returned in a bid response to the transaction bus 110.

Following the request and response interactions with console application 118, transaction bus 110 provides the requested data (or a reference thereto) to user application 104, along with code (e.g., JavaScript functionality) that is executed by user application 104 and determines when the requested data is or becomes viewable within user application 104. Periodically and/or upon the data becoming viewable, the code can execute a callback to transmit viewability information regarding the data to transaction bus 110. Transaction bus 110 can also notify console application 118 of the viewability data received from user application 104.

In conjunction with the operations described above, data associated with these operations can be captured from transaction bus 110 and console application 118, and processed by logging subsystem 112 for recording in log database 126, which can be, for example, one or more high-volume, high-performance databases made available through HPE Vertica or another provider. The processed data can then be retrieved from log database 126 by message queueing subsystem 128, which can include a streaming, distributed publish/subscribe (pub/sub) and messaging service, such as Apache Kafka™. Message queueing subsystem 128 can provide at-least-once messaging guarantees to ensure no messages are lost when a fault occurs, and highly available partitions such that a stream's partitions continue to be available even when a machine fails. Message queueing subsystem 128 makes processed data regarding historical events from log database 126 available to view predictor subsystem 114, for use in determining viewability likelihood, as further described below.

Ultimately, the data processing architecture depicted in FIG. 1 allows for predicted viewability data to be considered at large scale (e.g., thousands of simultaneous transactions or more) in a brief period of time (substantially real-time, e.g., within 1 second, 500 milliseconds, etc.) between transaction bus 110 receiving the call from user application 104 and returning data to it. In the context of an online advertising platform, this means that many simultaneous auctions to serve creatives to users can incorporate viewability data in the bidding process, while still completing the auctions and serving the creatives on the order of milliseconds, avoiding undesirable delays from the users' perspective.

Figure 2:
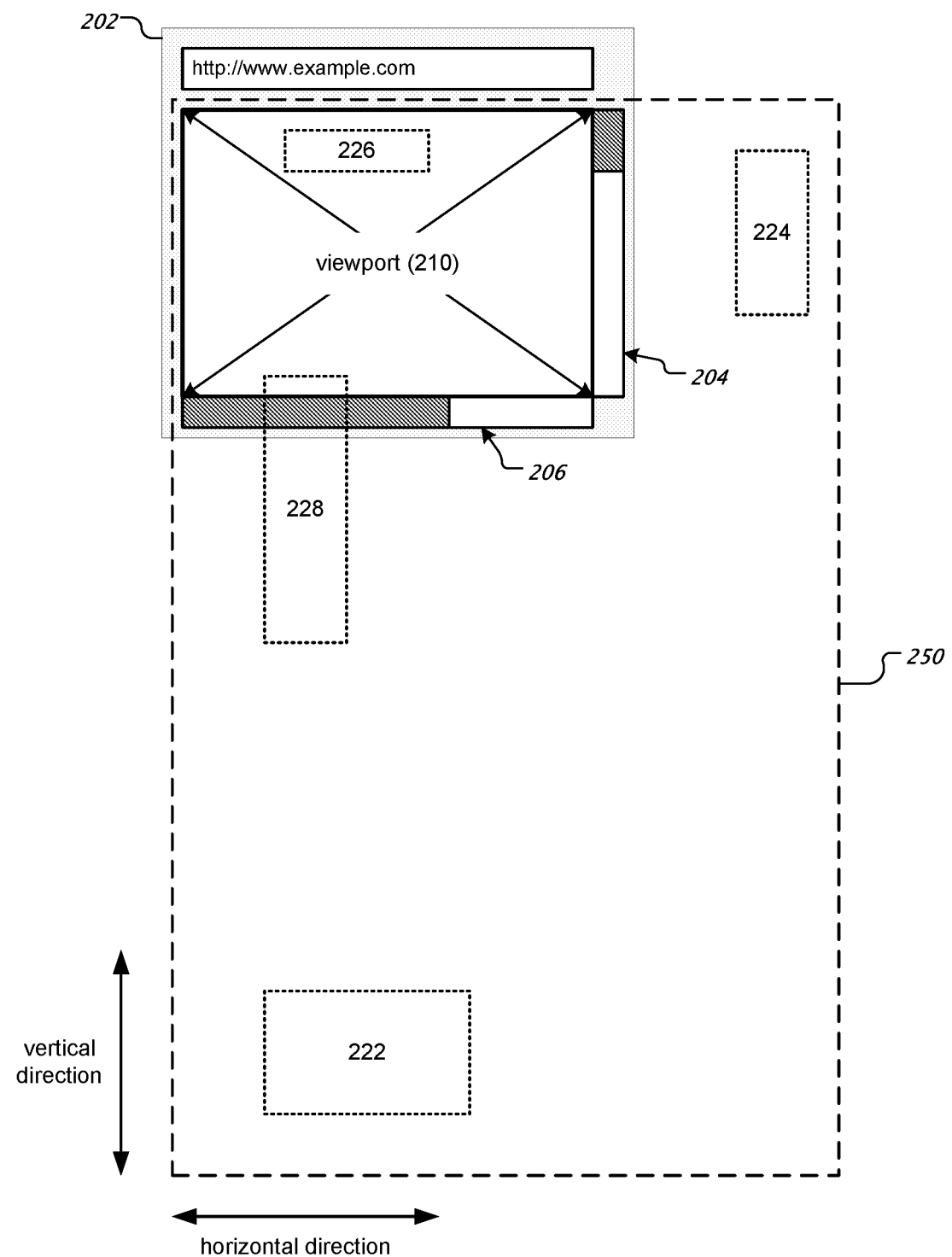
FIG. 2 depicts an example web browser window displaying a scrollable web page and having a defined viewport.

Referring now to FIG. 2, a viewport 210 of a user interface (e.g., of user application 104) is an area of the user interface within which content presented by the user interface is viewable (visible) to a user. For instance, viewport 210 can be a display area of a web browser window 202 displaying a scrollable web page 250. An image or video at the bottom of the web page 250 may not be in the display area, for instance, when the display area shows the top-half of the web page. As shown in FIG. 2, web browser window 202 displays only portion of a scrollable web page 250, in viewport 210. The browser window 202 includes a vertical scroll bar 204 for scrolling the web page 250 in the vertical direction, and a horizontal scroll bar 206 for scrolling the web page 250 in the horizontal direction. For a defined area 226 (e.g., space for an advertisement) that is within the viewport 210, the area is viewable (in the viewport 210). For a defined area 222 that is beyond the viewport 210 in the vertical direction, or a defined area 224 that is beyond the viewport 210 in the horizontal direction, such defined areas 222 and 224 are not viewable. For a defined area 228 that straddles a border of the viewport 210 but is partially within the viewport 210, the area 228 is considered viewable in some implementations. In further implementations, a defined area is considered viewable if at least 50% of the area is within the viewport 210 for at least one second or other minimum time period. In some implementations, a defined area is considered as viewable only if the entire area is within the viewport 210 for any amount of time. In another implementation, if the defined area includes a video, the defined area is considered viewable if at least 50% of the area is viewable for at least two seconds or other minimum time period, or if 100% of the area is in view for at least 50% of the duration of the video. In some instances, the definition of "viewable" is a custom definition that can be set individually by users of the data processing system.

Referring now to the example use case of an online advertising platform implementing real-time bidding auctions to serve advertisements to consumers, when a creative of a winning bidder is served to a user application (i.e., an impression), but the ad space is not in the viewport of the application, the creative in the ad space is also not in view of the user, and thus has little or no effect in advertising to the user for the winning bidder. It is desirable for bidders on an auction of an available ad space to know, before submitting bids on the ad space, the likelihood that the ad space will be viewable for a user after a creative is served to the ad space (i.e., the predicted viewability). When a notification of an available ad space is received by transaction bus 110 from user application 104 client device 102, transaction bus 110 can transmit instructions (e.g., a viewability script) to user application 104 to determine real-time or periodic viewability data of the ad space. The determined viewability data is then sent from user application 104 to transaction bus 110 and stored in database 126 for future calculations by view predictor subsystem 114, using a prediction model. A prediction model can be a mathematical formula that predicts the viewability for an ad space based historical viewability information and, in some instances, real-time viewability data received from the view script executing on user application 104, as well.

Other prediction models are possible. For instance, a prediction model can be a data structure (e.g., a graph, a lookup table) that can be used to predict the viewability of an ad space based on historical and/or real-time viewability data of the ad space. Particular implementations conduct an auction on the ad space by sending a bid request to multiple bidders that includes the predicted viewability. In this way, the bidders can submit their respective bids on the auction based on the predicted viewability.

Figure 3:
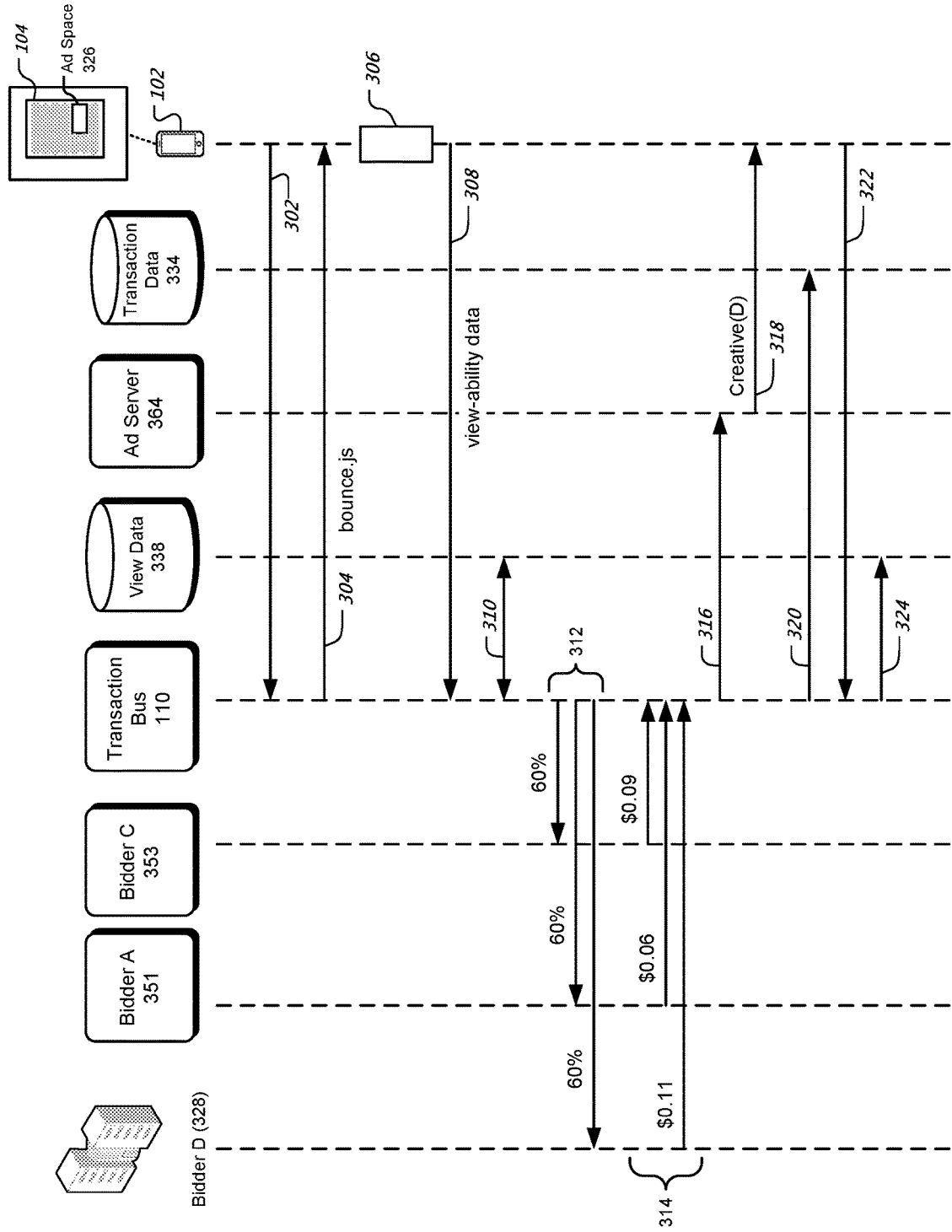
FIG. 3 depicts a data flow diagram of an example method for real-time data processing based on the viewable status of visual information within a viewport.

FIG. 3 is a data flow diagram of an example method for auctioning an available ad space 326 based on viewability of the ad space 326, using the system described herein. The example method can be implemented using transaction bus 110, for example. In FIG. 3, transaction bus 110 receives a notification (an ad call) of ad space 326 that is available in user application 104 executing on client device 102 (302). Transaction bus 110 sends to client device 102 instructions "bounce.js" (304). The instructions can be JavaScript or Java programming language instructions, for example. Other types of instructions are possible. The instructions are configured to be executed by client device 102 for determining viewability data for ad space 326 (306). Viewability data for ad space 326 can include an indication of whether ad space 326 is within a viewport ("in view") of user application 104, for example. For instance, the instructions can determine whether a Document Object Model (DOM) element corresponding to ad space 326 is within a bounding box corresponding to a viewport of user application 104. The instructions can be executed by user application 104 and determine whether ad space 326 is within the viewport, and send back to transaction bus 110 a message indicating whether ad space 326 is in view within the viewport (308). For instance, the message can include a flag with value of 1 indicating that the ad space is in view within the viewport, or value of 0 indicating otherwise.

In addition to whether ad space 326 is within a viewport of user application 104, the instructions can also determine other viewability data of ad space 326. For instance, the instructions can determine a position of ad space 326 (e.g., horizontal and vertical distances in pixels from the top left corner of the viewport), and a size (e.g., in pixels) of the viewport, and send back to transaction bus 110 the determined position of ad space 326 and size of the viewport. The position of ad space 326 relative the size of the viewport can indicate how probable it is that ad space 326 will be within the viewport at a later time, if ad space 326 is not already within the viewport, for example. The instructions can send back to transaction bus 110 an error message if the instructions cannot determine viewability data of ad space 326 (e.g., when user application 104 is hidden behind another user application).

In some implementations and by way of illustration, the instructions can comprise Javascript code as follows:

```
getViewabilityData: function(e) {
    var t, n, r, o = 0,
        i = this.isFriendlyFrame( );
    if (!i && void 0 === e.mozInnerScreenY) return {
        s: 1
    };
    if (i) {
        var c = this.injectVirtualElement( );
        t = this.getAbsolutePosition(e, c);
        for (var d, a, s = e; s != e.top;) {
            try {
                a = s.frameElement
            } catch (u) {
                return {
                    s: 4
                }
            }
            if (null === a) return {
                s: 5
            };
            s = s.parent, d =
this.getAbsolutePosition(s.parent, a), t = {
                x: t.x + d.x,
                y: t.y + d.y
            }
        }
        var l = s.innerWidth ||
s.document.documentElement.clientWidth ||
s.document.body.clientWidth,
            f = s.innerHeight ||
s.document.documentElement.clientHeight ||
s.document.body.clientHeight;
        r = {
            x: l, y: f
        }, n = this.isInView (t, l, f)
    } else void 0 !== e.mozInnerScreenY && (t = {
        x: e.mozInnerScreenX - e.screenX - 4,
        y: e.mozInnerScreenY - e.screenY - 40
    } , r = {
        x: screen.width - 8,
        y: screen.height - 119
    }, n = this.isInView (t, r.x, r.y));
    return (void 0 !== n && void 0 !== document.hidden &&
document.hidden || i && !e.top.document.hasFocus( ))
    && (n = !1, o = 3), {
        p: t, w: r, v: n, s: o
    }
    }
};
var c = function(n) {
    var r, o = "";
    try { n = e(n, 0);
    var c = e(new i(n), 1),
        d = c.getViewabilityData(window);
    void 0 ! == d.v && (o += "&" + n.iv + "=" + (d.v ?
```

```
1 : 0) ), void 0 !== d.p && (o += "&" + n.pos + "="
+ Math.round (d.p.x) + "," + Math.round (d.p.y) ) ,
void 0 !== d.w && (o += "&" + n.ws + "=" +
Math.round (d.w.x) + "," + Math.round (d.w.y)), r =
d.s, window.__anxpv = d
        } catch (a) {
"undefined" != typeof console, r = 2, t(a,
"AnViewModule::executeviewability")
        }
        return void 0 !== r && (o += "&" + n.vs + "=" +
r), "undefined" != typeof console, o
    };;
```

The viewability data returned by the function above comprises the viewport's width and height, the position of the top left pixel of the ads pace (x and y), and a binary flag that indicates whether the position is within the viewport or not. The position and viewport size are used to compute the relative position of the top left pixel by breaking the screen of the client device into 25 buckets: 5 buckets along the height and 5 buckets along the width and determining which bucket the x and y position falls in. Other divisions of the screen can be used. The bucketed relative position x and y and the binary flag are used as additional features X in the model described below. After receiving from client device 102 the viewability data determined by the instructions, transaction bus 110 calculates a predicted viewability for ad space 326. Alternatively, transaction bus 110 can calculate a predicted viewability for ad space 326 without the use of viewability data from client device 102 (e.g., the viewability script can be provided to client device 102 on completion of the auction, instead of prior to bidding, and be used to gather viewability data for future viewability tracking and/or billing purposes).

The viewability likelihood can be a probability that ad space 326 is positioned within the viewport at a time instance after the previous time instance when the instructions determined the viewability data of ad space 326, for example. More particularly, the viewability can be a probability that ad space 326 is positioned within the viewport or a part of the view port when a creative is served to the ad space. The viewability likelihood can also be a value representing the probability that ad space 326 will become viewable at any time.

Transaction bus 110 (through view predictor subsystem 114) can calculate a predicted viewability for ad space 326 using a prediction model of one or more discrete features or parameters. A feature can be a parameter describing ad space 326 (e.g., an ad tag identifier), an ad space inventory to which the ad space 326 belongs (e.g., a web address for the web domain of the ad space inventory), user application 104 (e.g., an application identifier), client device 102 (e.g., a device identifier, or a device type identifier), or the user of the client device 102 (e.g., a user identifier). A feature can also be a combination of one or more of these features. For instance, a feature can be a combination of ad space and ad space inventory, a combination of ad space and application, or a combination of ad space inventory and application. Other combinations are possible.

By way of illustration, the prediction model can be a logistic function of one or more features with coefficients for the features as follows:

$$p = \frac{1}{1 + e^{-(\beta_0 + X_1\beta_1 + \ldots + \beta_n X_n)}}$$

In the logistic function above, p is a predicted viewability. $X_1, \ldots, X_n$ are n features. $\beta_0, \beta_1, \ldots, \beta_n$ are coefficients. View predictor subsystem 114 can receive from view data database 338 (which can be, e.g., log database 126 in FIG. 1) coefficients of the logistic function (310) and the historical view rates for each of the features, and calculate a predicted viewability for ad space 326 using the logistic function. Viewability can also be predicted as described in U.S. patent application Ser. No. 15/180,913, filed on Jun. 13, 2016, and entitled "Online Ad Auction Based on Predicted Ad Space Viewability," the entirety of which is incorporated by reference herein.

After calculating a predicted viewability of ad space 326, transaction bus 110 conducts an auction on ad space 326 by sending a bid request to multiple bidders, for example, bidder C 353, bidder A 351, and bidder D 328 (312). In addition to ad space and user information, the bid request includes the predicted viewability (e.g., 60%) calculated with the prediction model. In this way, a bidder can determine its bid price for ad space 326 based on the predicted viewability. In some implementations, the bidder can submit a CPM or CPC bid at a price deemed appropriate based on the predicted viewability, or the bidder can submit a cost-per-view (CPV) bid. In a CPV model, advertisers typically pay each time their advertisement is viewed by a user. As further described below, the bidder can also submit a viewable CPM (vCPM) bid, such that the associated advertiser only pays for ads that become viewable.

Transaction bus 110 will calculate a corresponding estimated, or expected, CPM (eCPM) bid for use in the auction bid ranking. An estimated CPM (eCPM) bid is a CPV bid multiplied by the predicted viewability. For instance, bidder A 351 may determine a CPV bid price of $0.10 for an ad space of the ad space inventory including ad space 326. Based on the predicted viewability of 60% that the ad space 326 will be viewed by a user, transaction bus 110 will discount the bid price for ad space 326 to $0.06. In some implementations, a seller is able to set an eCPM floor price for their inventory which serves as a minimum bid for eCPM bids. In a second-price auction, the eCPM bid can act as the second price in the auction should a non-eCPM bid win. Other methods for bidding for an ad space by a bidder based on a predicted viewability of the ad space are possible. For instance, a bidder may forgo submitting a bid on the auction if the bidder determines that the predicted viewability is less than a specific threshold (e.g., less than 35%).

If a eCPM bid wins an auction, transaction bus 110 will log the transaction, except that the transaction will have no cost to the buyer or revenue to the seller. An encoded data structure, which includes the transaction ID and the CPV price, is then served with the creative and a viewability measurement script (described below). The measurement script executes in the client devices, determines whether the creative associated with the bid was viewable, and sends the measurement results back to the transaction manager 112 including the encoded data structure. If the measurement results indicate that the creative is viewable, the transaction bus 110 will log the cost information for the transaction and send notification to the bidder that the CPV bid was viewed and therefore charged.

Bidders can send their respective bid price for ad space 326 to transaction bus 110 (314). In FIG. 3, transaction bus 110 selects the highest bid price of $0.11 from bidder D 328, and notifies ad server 364 (316). Ad server 364 then sends a creative for bidder D 328 to client device 102 to be served to ad space 326 (318). In addition, transaction bus 102 records transaction information (e.g., winning bid price, winning buyer, ad space 326, time stamp, and so on) in the transaction data database 334 (which can be, e.g., log database 126 in FIG. 1) (320).

In some implementations, after the creative for bidder D 328 is served to ad space 326, instructions (e.g., JavaScript) can determine whether ad space 326 is in view of user application 104, and send back to transaction bus 110 a message indicating whether ad space 326 (containing the creative for the bidder D 328) is in view in user application 104 (322). The instructions check that an actual ad is present (versus just a container for an ad). They also measure according to one or more definitions of a "viewable" impression, which generally is a function of how much of the ad is in-view and for how long. The measurement data determined by the instructions is a result with three options: 1) unable to measure, 2) measured not viewable, 3) measured viewable. Transaction bus 110 can store the in-view data in view data database 338 in reference to ad space 326 (324). Other methods for determining whether ad space 326 and the creative for the bidder D 328 are in view in user application 104 are possible. For instance, the creative may send to transaction bus 110 a notification of a click event when the creative is selected by the user. In further implementations, a mobile application executing on client device 102 uses a software development kit (SDK) for determining viewability of ad spaces in the mobile application's user interface, which data can be sent to transaction bus 110.

A model generator or other software component in data processing system 100 can use the in-view data to update the prediction model described earlier, for example. In some implementations, the historical viewability data for each feature is updated hourly, with a 24-hour lookback window. In some implementations, the features can include ad tag ID, website domain, client device operating system, bucketed relative position x, bucketed relative position y, and so on. The model generator uses the historical viewability rates of the features to build a logistic regression model that assigns different weights or model coefficients to each of the features. A new model can be computed every day using the previous day's viewability rates and the model coefficients are updated. These model coefficients are then used along with the historical viewability data to compute the predicted viewability of all ad spaces for that day.

Figure 4:
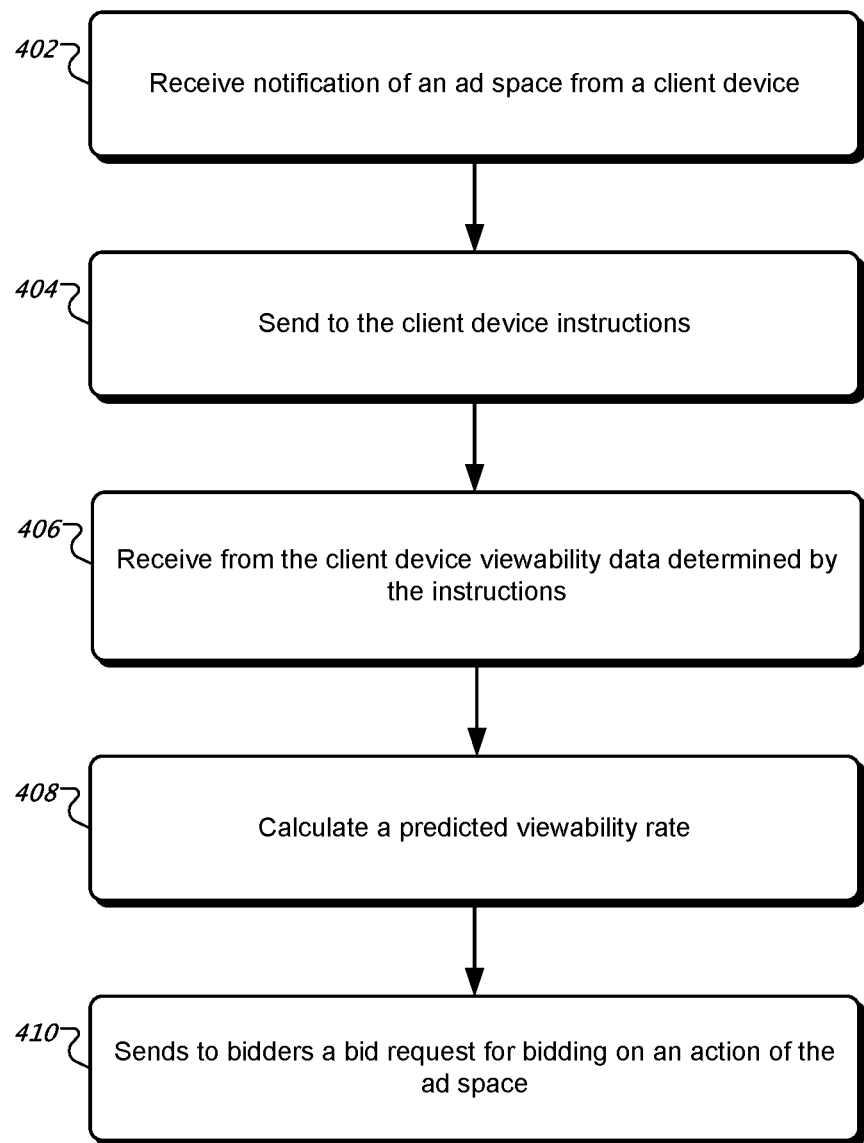
FIG. 4 depicts a flowchart of an example method for real-time data processing based on the viewable status of visual information within a viewport.

FIG. 4 is a flowchart of another example method for auctioning an available ad space based on a predicted viewability of the ad space using an implementation of the system described herein. The method begins by receiving a notification of an ad space, the ad space being part of an ad space inventory of a seller, the ad space being for presentation in a user interface of an application executing on a client device of a user (402). The method sends, to the client device, instructions configured to be executed by the client device for determining viewability data of the ad space, the viewability data comprising whether the ad space is within a viewport of the user interface (404). The method receives, from the client device, the viewability data as determined by the instructions at a first time instance (406). The method calculates a predicted viewability such that the ad space is likely to be positioned within the viewport at a second time instance after the first time instance, wherein calculating the predicted viewability uses a prediction model comprising one or more features (408). The method sends, to a plurality of bidders, a bid request for bidding on an auction of the ad space, the bid request comprising the predicted viewability (410).

In one implementation, the data processing system described herein implements a viewable exchange in which impression inventory is available to impression buyers who only want to pay for impressions that are viewable. Using the exchange, buyers are able to bid on impressions that are predicted to be viewable post-auction, with such predictions being made as described herein or in some other manner. The operator of the present system can act as an intermediate party that charges a premium in order to take the risk that an impression ultimately may not be viewable. More specifically, the system can accept viewable CPM (vCPM) bids, and if the expected CPM is calculated to be the highest bid in the auction, publishers are paid the expected CPM.

A transparent risk premium fee, in the form of a bid reduction, is charged to take the risk and facilitate buying 100% viewable. The risk premium fee is not a fee that is "charged" to either buyer or seller. Rather, in effect it reduces the eCPM bid that is submitted to the seller's auction, creating a difference between what is paid out to sellers and what it is likely to be paid in from buyers. In one example, the risk premium is 10% of the bid value after applying the predicted view rate; however, the risk premium can change based on the accuracy of the predicted view rate over time. For example, if the predicted view rate model improves over time such that its predicted view rate calculations are more accurate, the risk premium can be lowered. The model performance can be determined by comparing the predicted view rates for impressions with log data indicating whether the impressions ended up being viewable. The risk premium can be recalculated periodically, e.g., weekly. In one implementation, the premium is not logged or reported to either buyer or seller; the seller only sees the price paid for their impression by the intermediate party.

Figure 5:
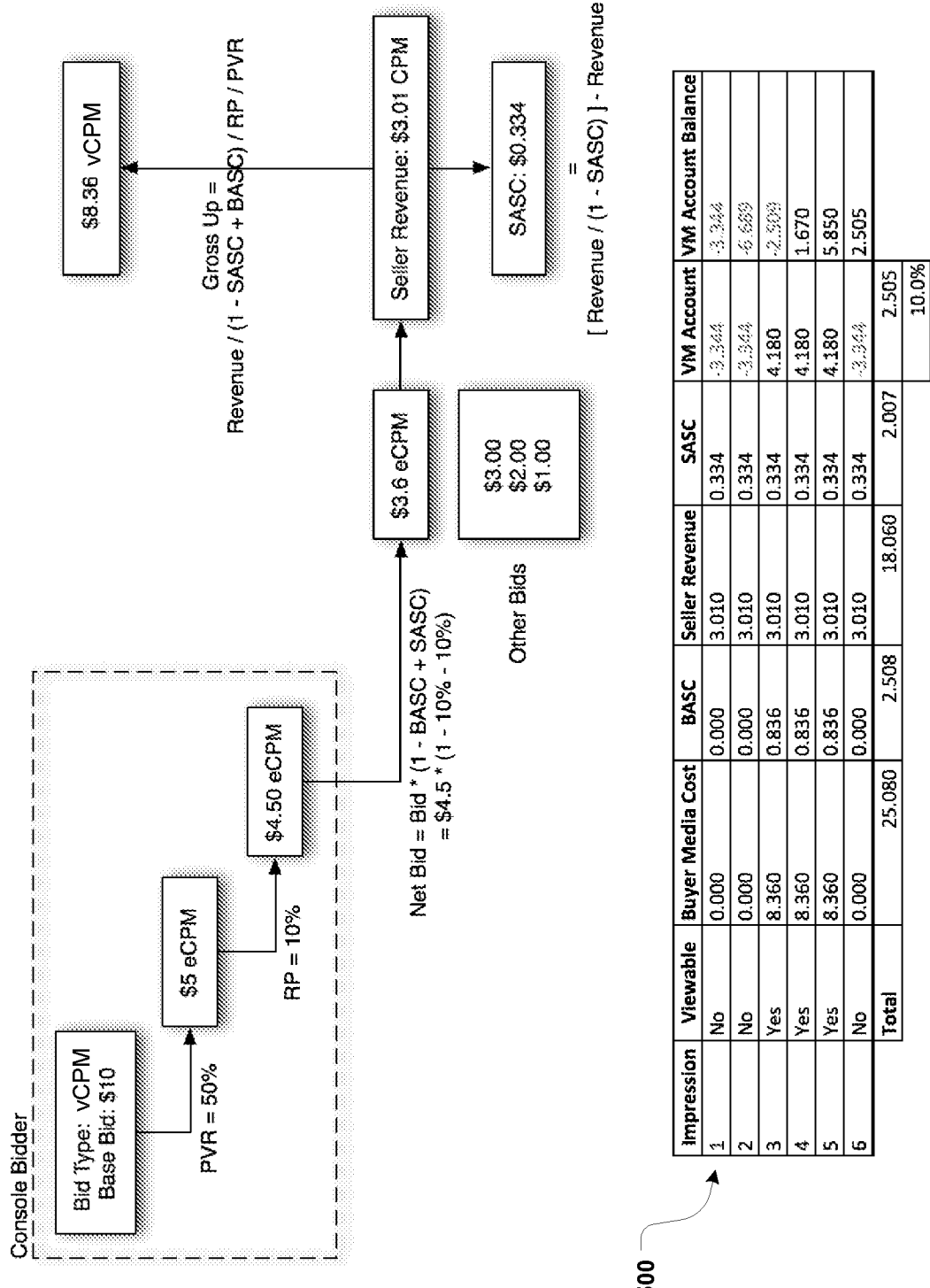
FIG. 5 depicts example value calculation dynamics based on a predicted view rate of visual information within a viewport.

Referring now to FIG. 5, in the viewable exchange, buyer payments are effectively separated from seller revenue by using the present system in the transaction. On each impression, the system pays the impression seller and seller-associated fees (SASC), regardless of whether the impression was actually viewable. When, however, an impression is determined to be viewable, payment is collected from the impression buyer, net buyer-associated fees (BASC). In the example shown, a buyer submits a $10 vCPM bid in an impression auction. A predicted view rate (PVR) is calculated for the impression that represents the likelihood that the impression will be viewable, and is applied to the initial bid value (here, the $10 bid is multiplied by a PVR of 50%, resulting in a modified bid of $5). The system then applies a risk premium (RP) to the bid, representing the consideration to the system provider in exchange for taking the risk. Here, a 10% risk premium reduces the total bid to $4.50 eCPM. The net bid can then be calculated by multiplying the foregoing bid value by (1−BASC+SASC), which in this example results in an eCPM bid value of $3.60. For a second-price logic auction, the winning bid (here, the $3.60 bid) is reduced to $0.01 above the second highest bid, resulting in a CPM bid/seller revenue of $3.01. The gross up value based on the seller value can be calculated by Revenue/(1−SASC+BASC)/(1−RP)/PVR. In the depicted example, the gross up value is 3.01/(1−0.2)/(1−0.10)/0.50=$8.36.

FIG. 5 also depicts a ledger 500 that tracks payments made to sellers and received from buyers (depending on whether an impression was viewable or not viewable) and the resulting balance in a viewable exchange marketplace (VM) account. At any given moment, the balance could be positive or negative, depending on the performance of the viewability prediction. In other words, if viewability predictions made by the system tend to be inaccurate (i.e., impressions expected to be viewable are not viewable), more payments are made to sellers than are received from buyers, resulting in an imbalance irrespective of the risk premium collected. Assuming perfect prediction and no risk premium, the balance would be roughly $0.

Under some circumstances, the behavior of impression inventory transacted in the viewable open exchange deviates from an exchange-wide inventory average. To correct any consistent over or under bias (i.e., an over or under bias over several days or some other period of time) in the prediction of viewable marketplace inventory, a gross adjustment can be made to the predicted view rate of inventory identified as experiencing such bias. In one implementation, the mechanism used is a "tag bias corrector," by which a bias adjustment is made to the PVR of ad tags identified as having a consistent over or under bias.

In addition to potential issues with consistent over/under prediction, there may be inventory that is significantly less predictable than the platform average (that is, higher standard deviation), even if there is no over/under prediction for the inventory on average. Because it is generally desirable only to take risk on inventory where there is a reasonable confidence that the viewability can be predicted, such unpredictable inventory can be identified by its deviation and blacklisted or otherwise removed from the marketplace.

Referring again to the system 100 of FIG. 1, an ad auction using the viewability exchange will now be described. To summarize, for an impression buyer who wishes to only pay for impressions that are viewable (that is, to bid on a viewable CPM (vCPM) basis), the exchange (via transaction bus 110) will automatically translate the vCPM bids from the buyer to CPM revenue for the seller, facilitating a transaction and bridging the currency gap between buyer and seller. The vCPM to CPM conversion rate can be calculated on every impression, based on the predicted viewability of the impression (received from view predictor subsystem 114), and the predicted viewability can be sent in a bid request to buyers. If a buyer chooses to bid on a vCPM basis, their bid will be converted and entered into the seller's auction as a CPM bid, with normal auction mechanics applied by the transaction bus 110. Should the bid win the auction, the seller will be paid the CPM price. The buyer's creative will be served to user application 104 with a viewability measurement script, and the buyer will only be charged the vCPM price if the impression is measured viewable. A default definition of a viewable ad (50% of pixels in-view for 1 continuous second) and a standard viewability script can be used, or other definitions and/or scripts can be substituted.

The following describes in further detail how the auction works when a buyer submits a vCPM bid using the exchange. When an ad call is received from user application 104, the exchange (including transaction bus 110 and view predictor subsystem 114) determines a prediction for the likelihood that the impression will be measured viewable. If a prediction cannot be determined, then the impression will be ineligible for vCPM bids. There may be other reasons for not supporting vCPM bids. For example, monitoring may indicate that the prediction for the given placement is inaccurate, which may lead the placement to be marked ineligible. If the viewability prediction is available, and other eligibility checks pass, then the exchange calculates a vCPM to CPM conversion rate, which is the viewability prediction multiplied by a risk adjustment, as described above.

On the bid request made by transaction bus 110 to console application 118, the exchange indicates that it will accept vCPM bids. To do this, it defines an object in the request, which includes the payment type (vCPM), view, and the vCPM to CPM conversion rate. On a bid response received from console application 118 by transaction bus 110, if a particular buyer has chosen to submit a vCPM bid, it will be indicated by a field in the response set to "view." The bid price submitted as part of the response will then be treated as a vCPM price. It is possible for the vCPM bid to be rejected. In addition to standard rejection reasons (such as failing seller ad quality rules), monitoring may indicate that the prediction for the given creative is inaccurate, resulting in the creative being marked ineligible. If the bid passes these checks, then, for the purposes of running the auction, the exchange will convert the vCPM bid to CPM using the provided conversion rate. In one implementation, transaction bus 110 computes 2 parallel arrays to keep track of the bid value in each different form of measurement (vCPM and eCPM, which differ by the conversion rate).

After bids are received, and any vCPM bids are converted to CPM, the auction can be executed by transaction bus 110 according to standard real-time bidding mechanics, including, where applicable, second-price logic, private marketplaces, publisher floors, etc. If a CPM bid representing a buyer's viewable bid is the winning price in the auction, it can be adjusted post-auction (for example, in a second price auction, it can be price-reduced to the second highest bid+$0.01), and the seller will receive this amount as revenue (minus standard auction fees). The price-reduced CPM bid is converted back to a vCPM price, using the conversion rate. The buyer can be notified that it won the auction at the price-reduced vCPM price.

Following the auction, the winning buyer's creative is served to user application 104, along with a viewability measurement script. If the script determines that the creative is viewable, an event will be sent to transaction bus 110 indicating that the buyer should be billed for the impression at the price-reduced vCPM price. The exchange can log the transaction using logging subsystem 122 and send a notification to the buyer. If the measurement script determines that the ad is not viewable, or if it is unable to make the measurement, then the buyer is not billed for the impression.

The nature of the auction mechanics, described above, creates a disconnect between how the buyer is charged and how the seller is paid. On any single impression, it is likely that the seller is paid either significantly more or less than the buyer has been charged. Over many impressions, however, the difference between what is charged and what is paid should converge. The key factor in this convergence is the accuracy of the predicted viewability rate; that is, the difference between the actual viewability rate and the predicted viewability rate. To illustrate the impact of prediction accuracy on the amount billed versus the amount paid, three different scenarios are described below: perfect prediction, under prediction, and over prediction. In the examples below, a buyer bids $10 vCPM on supply with a 50% predicted viewability rate; the exchange converts the vCPM bid to a $5 eCPM bid; the second-highest bid in the auction is a $4 CPM bid; it is a second price auction, so seller is paid $4.01 CPM; and the buyer is charged $8.02 vCPM (that is, only if the impressions is measured viewable).

All else being equal, if the exchange perfectly predicts the viewability rate for a given piece of inventory, then the aggregate amount charged to the vCPM buyer will match the aggregate amount paid to the seller. On the other hand, if the exchange over-predicts the viewability of the inventory, then the aggregate amount charged to the vCPM buyer is less than the aggregate amount paid to the seller For example, if the exchange predicts a 50% viewability rate, but the inventory has only a 25% viewability rate, the exchange is left with a negative balance. Alternatively, if the exchange under-predicts the viewability of the inventory, then the aggregate amount charged to the vCPM buyer is greater than the aggregate amount paid to the seller. As one example, if the exchange predicts a 50% viewability rate, but the inventory has a 75% viewability rate, the exchange is left with a positive balance.

In some implementations, on every eligible impression, the exchange calculates a vCPM to CPM conversion rate prior to sending bid requests. The conversion rate is then sent in the bid request, and, if any vCPM bids are returned, it is used to determine the eCPM price used for the seller's auction. To generate the conversation rate, the exchange uses the predicted viewability rate of the given impression and a pre-configured risk adjustment. The two rates can be multiplied to generate the impression's conversion rate: conversion rate=predicted viewability rate*(1−risk factor).

The exchange acts as a financial buffer between buyer and seller, and, depending on the accuracy of the viewability prediction, the exchange may have a positive or negative balance over time. An unexpected material inaccuracy in the viewability prediction has the potential to cause the exchange a significant financial loss. By measuring and monitoring the overall accuracy of the viewability prediction, as well as the historical performance of the marketplace, it is possible to model the financial risk to the exchange involved in the offering. As noted above, to compensate for the risk of financial loss, an adjustment (risk premium) is applied to the predicted viewability rate when generating the vCPM to CPM conversion rate. The adjustment creates a default difference between the amount charged to vCPM buyers and the amount paid to sellers. In other words, in the scenario where there is perfect viewability prediction and all else is equal, the exchange will have a net positive balance, equal to the adjustment percent. There is, however, no guarantee that the configured rate will be achieved, as the final net balance is a function of the viewability prediction accuracy.

In one implementation, publishers benefit from the presently disclosed techniques by being able to negotiate and provide viewable ad delivery guarantees. Traditionally, given knowledge of historical web page views and other tracking data, publishers are able to guarantee to advertisers that they will receive a guaranteed number of impressions with a guaranteed CPM over a particular campaign or period of time. Here, however, historical and predicted view rates can be applied to guarantee a number of impressions that will be viewed (based on the particular definition of what makes an ad viewable) in negotiating a deal between a publisher and an advertiser. Such "VCPM guaranteed line items" are fulfilled by considering the viewable status of served impressions in conjunction with a pacing algorithm to ensure that a budget allocated to the line item is spent fully and at an even pace (using, e.g., bids in real-time bidding auctions for serving impressions) to achieve the guaranteed number of impressions over a flight period. The pacing algorithm can, for example, increase bid amounts if an insufficient number of auctions are being won over a period of time (e.g., a bid multiplier can be recalculated on a daily basis or other frequency). These bid amounts can also be calculated, as described above, based on a predicted view rate of the auctioned impression.

Generally, in a guaranteed ad serving system, line item selection is determined by a weighting mechanism where delivery against budget, as opposed to price, is the primary factor impacting selection. However, strictly basing line item selection on price ignores the need to maintain even delivery of guarantees. In one implementation, to address this issue, bidders (e.g., console application 118) provide in their bid responses to transaction bus 110 a valuation (referred to here as "priority CPM" or "pCPM") that reflects the guaranteed line item's need for fulfillment. Whether received from a bidder, calculated by transaction bus 110, or otherwise, pCPM for a particular line item is determined based on pacing towards a goal. For example, the further a line item is from the goal for a particular defined interval, the higher the pCPM should be. During an auction for an impression to be served to an impression consumer, guaranteed line items can be evaluated based on their priority level, and those with the highest priority level are evaluated first. If no line having a highest priority level is in need of the impression, line items in the next highest priority level are evaluated, and so on. Guaranteed line items that have already met their budget goals for a particular defined interval of time can be ignored (i.e., no bid for the impression is entered). Further, a randomness factor can be applied to ensure that the same line item is not always selected within an interval where pCPM is static.

For the present guaranteed ad serving system for viewable impressions (rather than for all impressions, generally), the priority CPM concept is similar, but must be translated into priority viewable CPM (pVCPM). Line items with viewable impression goals need to achieve viewable impression guarantees instead of impression guarantees, which requires modifying the calculation of the bids needed to hit pacing goals. In addition, whereas every impression is worth the same for impression-based goals, only viewable impressions are considered for viewable goals. To optimize yield, guaranteed line items should take into account the predicted viewability of each impression, which involves certain considerations when it comes to pacing.

The goal of yield optimization for guaranteed delivery is to maximize the revenue from non-guaranteed demand while hitting a delivery goal. This is a constrained optimization problem, in which the publisher attempts to minimize the cost of their guaranteed commitment. When the goal is to reach an impression goal and all impressions contribute the same towards hitting that goal, it can be shown that for a given budget goal (per minute, hour, day, etc.), there is a single optimal allocation price, P*, that will maximize revenue. The publisher would prefer to serve guaranteed if and only if the highest non-guaranteed bid is below P*. P* is, thus, the optimal bid, given the budget goal.

When some impressions contribute more than others, however, there is no longer such a simple solution. When a line item has a viewable impression goal, some impressions will be viewable and some will not. Suppose each impression, i, has a probability $v_i$ of being viewed. It can be shown that the optimal allocation rule for viewable impressions goals is to bid pVCPM=$\Delta \cdot v_1$. That is, the optimal strategy is to modify a base bid, lambda, by the predicted viewability of each impression. This implies that line items with viewable impression goals would ignore any impression that has a predicted viewability of zero (because the product of lambda and the predicted viewability, and thereby pVCPM, would be zero).

In one implementation, lambda is calculated based on eligibility data and win rate curves for each impression inventory chunk with a distinct $v_1$. In another implementation, lambda is calculated based on eligibility data and win rate curves for each viewability value, which can be approximated with viewability buckets. This can be seen by working through the viewed delivery equation, below. Suppose, for example, that there are 10 discrete viewability buckets (0.1, 0.2, . . . , 1.0). Let $E_i$ be the number of eligible impressions in bucket i and $F_i$ be the win rate in bucket i. The viewed delivery for impressions is then:

$$\text{Viewed Delivery} = \Sigma E_i \cdot F_i(\lambda \cdot v_i) \cdot v_i$$

That is, the viewed delivery is the sum of delivery in each bucket multiplied by the viewability rate in each bucket. The delivery in each bucket is its eligibility (the number of impressions multiplied by the win rate when bidding lambda multiplied by viewability). Solving for the lambda that would hit a given target viewable impression goal can be achieved by computing win rate curves per viewability bucket.

Various techniques can be used to pace the spending of a budget for delivering viewable advertisements. In one implementation, a standard guaranteed delivery algorithm can be updated to account for viewable impressions, such that auction wins without views are not considered. In one example, if the average viewability rate for a particular time interval t (since the previous calculation) is:

$$\overline{V}_t = \frac{\sum v_{it}}{\text{bids since last update}}$$

then the viewable impression bid can be calculated as:

$$pVCPM_i = \frac{v_i}{\overline{V}_t} \cdot \text{base } pCPM_t$$

Note that if there is no variation in viewability, then the bid price is the base pCPM. Further, without average viewability rate in the denominator, multiplying the bid by the predicted viewability would generally produce too low of a bid for a viewability less than 1.

In another implementation, rather than solving for a bid price that achieves a delivery goal, a pacing factor is calculated and applied to a bid price. One such pacing algorithm for moderating spend using a proportional-integral-derivative (PID) controller is described in U.S. patent application Ser. No. 15/416,132, filed on Jan. 26, 2017, and entitled "Systems and Methods for Real-time Structured Object Data Aggregation and Control Loop Feedback" ("the '132 application") the entirety of which is incorporated by reference herein. In this case, starting with an arbitrary base bid, the controller can computationally solve for the optimal lambda. That is, the bid is calculated as:

$$pVCPM_i = v_i \cdot \text{initial } pCPM \cdot \text{pacing modifier}$$

In general, the value of the initial pCPM is not critical, and can be a value near the average estimated clear price (a bid price that is likely to win most impressions based on historical bids and their success or failure) for the publisher or other impression inventory seller.

In further implementations, to optimize yield given a viewability goal, a correct target should be set for delivery. To achieve the foregoing, eligibility and win rate curves are computed per viewability bucket, and this information is used to computationally arrive at an optimal pacing target.

Figure 6:
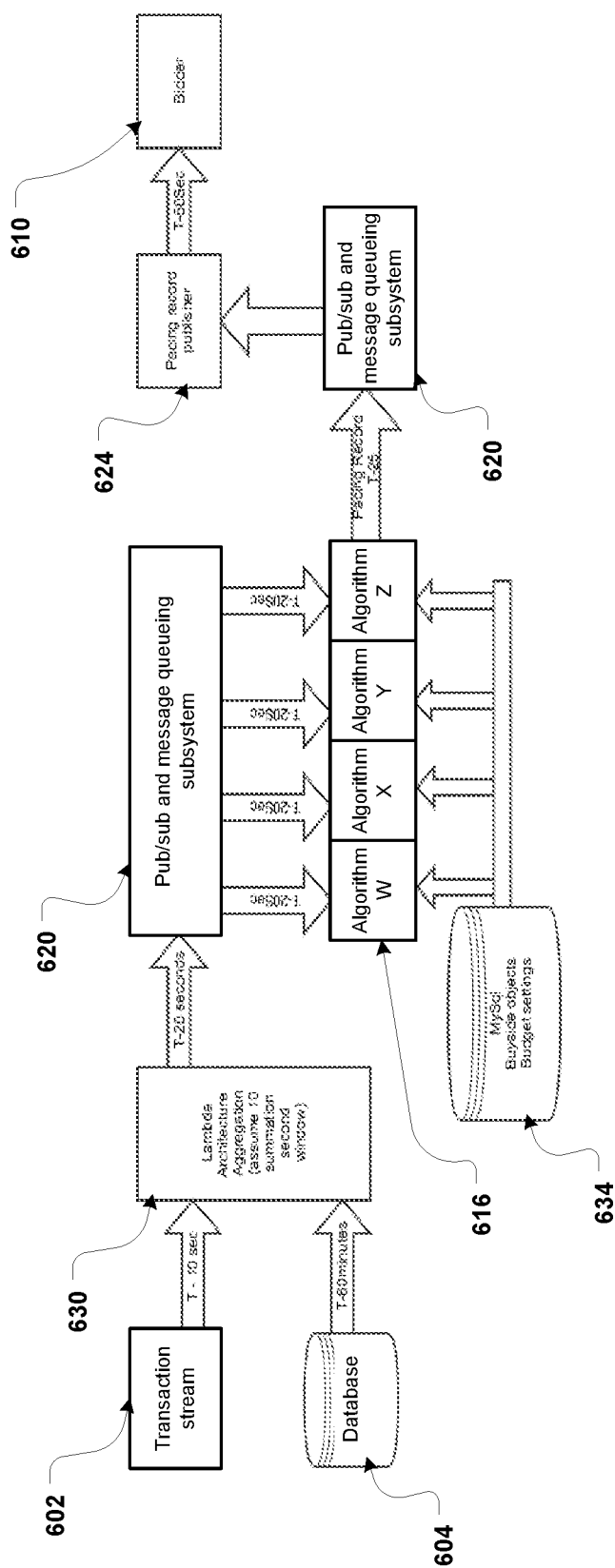
FIG. 6 depicts an example architecture of a system for real-time stream processing to provide data to a control loop feedback algorithm.

In one implementation, to enable the pacing techniques described above, the present system can incorporate a stream processing architecture to provide bidders with pacing data used to calculate pCPM, as depicted in FIG. 6. The stream processing architecture includes a streaming layer, execution layer, and processing layer. In one implementation, streaming layer is a distributed publish/subscribe (pub/sub) and message queueing system 620, such as Apache Kafka™. For example, streaming layer can provide at-least-once messaging guarantees to ensure no messages are lost when a fault occurs, and highly available partitions such that a stream's partitions continue to be available even when a machine fails. Execution layer includes a cluster scheduler for allocating processes and executing jobs, such as Apache Hadoop® YARN (Yet Another Resource Negotiator). Processing layer can include an application programming interface (API) that provides for communication among the layers of the stream processing architecture and performs other tasks as described herein.

As in YARN, execution layer can include a Resource Manager and a Node Manager. Individual machines each run a Node Manager, which is responsible for launching processes on that machine. The Resource Manager communicates with Node Managers to instruct them which jobs to execute. Processing layer can be used to inform the Resource Manager when a new job is to be created. The Resource Manager instructs a Node Manager to allocate space on a cluster and execute the requested job.

The use of the stream processing architecture depicted in FIG. 6 in conjunction with the system of FIG. 1 provides advantages over existing computing systems that perform similar tasks using batch processing of transactions, which results in high latency. This combined system instead lowers latency by processing real-time transaction streams 602 (e.g., streams with data arriving in real-time or periodically in short periods, such as every 5 or 10 seconds), and aggregating the real-time data with data stored in high-volume, high-performance databases 604 (e.g., made available through HPE Vertica). The combined system reduces latency in provided input data to a pacing control function (caused by minutes-long delays in updating bidder pacing parameters after receiving auction results) by having only a simple pacing control mechanism in bidders 610 and locating more complex pacing logic into an external pacing subsystem. Accordingly, the time between auction win notification (identified as "T") and the application of a new pacing strategy by a bidder 610 can be reduced to 60 seconds or less (T−60).

The architecture of FIG. 6 provides a pull mechanism for pacing records. More specifically, pacing record publisher 624 can subscribe to the pub/sub and message queueing system 620 (e.g., Kafka) in the streaming layer and push the received records to bidders 610 at a specified rate (e.g., T−60 seconds). Algorithms W, X, Y, and Z (616) represent additional pacing controllers that can be implemented without impact or dependency on downstream components (e.g., pacing record publisher 624, bidder 610). In one implementation, one such algorithm is a bid price pacing algorithm such as that described in U.S. patent application Ser. No. 14/561,615, filed on Dec. 5, 2014, and entitled "Modulating Budget Spending Pace for Online Advertising Auction by Adjusting Bid Prices," the entirety of which is incorporated by reference. In another implementation, another algorithm includes a day part optimization algorithm that examines historical conversion data and weights an advertising budget across different hours of the week according to their respective conversion rates.

To reduce the latency and enable a quick feedback loop from pacing controller to bidder 610, Lambda architecture-based data processing 630 can be used. The data layer can create data streams from batch-retrieved data stored in a database 634 (e.g., cumulative spend data, budget, time zone information, and other data) and combine them with a real-time transaction stream to compute current spend for advertising objects or elements (campaign, advertiser, etc.) as of a particular time. A spend aggregation job (in the format of, e.g., an Apache Samza job) is then created at the execution subsystem that consumes the streams to aggregate the cumulative spend, booked revenue and delivered impressions for the objects and streams the results to the pub/sub subsystem 620 periodically (e.g., every 10 seconds).

Figure 7:
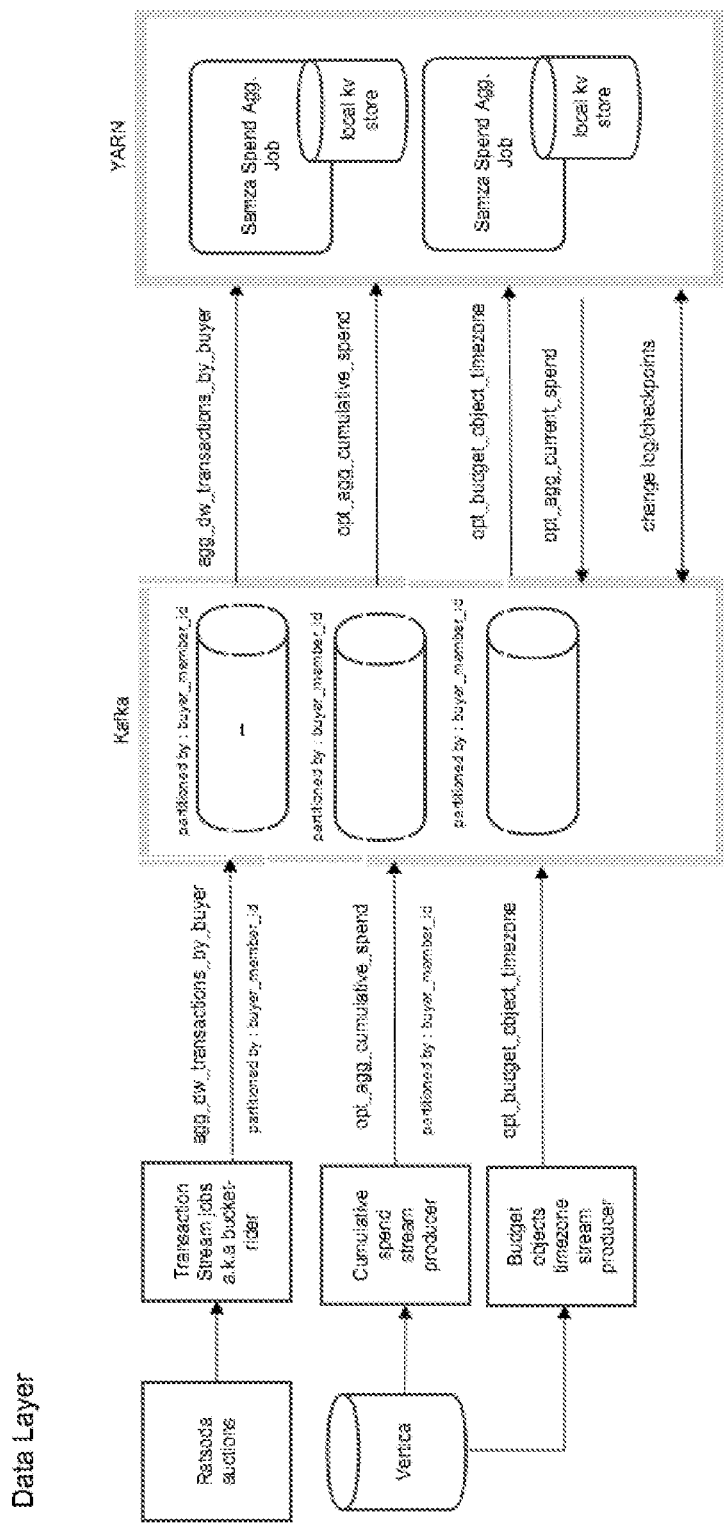
FIG. 7 depicts an example data layer of a stream processing system according to an implementation.

Now referring to FIG. 7, the data layer can create data streams (opt_agg_cumulative_spend and opt_agg_budget_object_timezone) from batch-retrieved data stored in a database (e.g., cumulative spend data, budget, time zone information, and other data as described below) and combine them with a real-time transaction stream (agg_dw_transactions_by_buyer) to compute current spend for advertising objects or elements (campaign, advertiser, etc.) as of a particular time. A Spend Aggregation job (in the format of, e.g., an Apache Samza job) is then created at the execution subsystem that consumes the agg_dw_transactions_by_buyer and opt_agg_cumulative_spend streams to aggregate the cumulative spend, booked revenue and delivered impressions for the objects and streams the results to the pub/sub subsystem periodically (e.g., every 10 seconds).

The Spend Aggregation job can use a local key-value (kv) store to aggregate cumulative spend, booked revenue, and delivered impressions by an object identifier and/or object type. As one example, the job can maintain three tables in the key-value store: (1) current day cumulative spend, (2) current hour spend, and (3) previous hour spend. Periodically (e.g., every five seconds), the job merges the spend data from the three tables and writes a message with data on current spend (opt_agg_current_spend) to the message queuing subsystem. When hourly spend data is available, a cumulative spend stream producer job can aggregate the spend, booked revenue, and impressions for the current day (at campaign, campaign group and insertion order) and publish a message with cumulative spend data (opt_agg_cumulative_spend) to the messaging queue subsystem. This job consume three streams: (1) the transaction stream (agg_dw_transactions_by_buyer), which is fed by the real-time processing system, (2) the cumulative spend stream (opt_agg_cumulative_spend), and the object level time zone stream (opt_budget_object_timezone), the latter two of which can be fed by Vertica stream producers from batched data. Object level time zone is used to report the metrics at object local time zone scope. Settings for message priority can be enabled to prioritize the real-time stream over the batch stream, so that the real-time processing doesn't slow down if there is a sudden burst of data on the batch stream.

Figure 8:
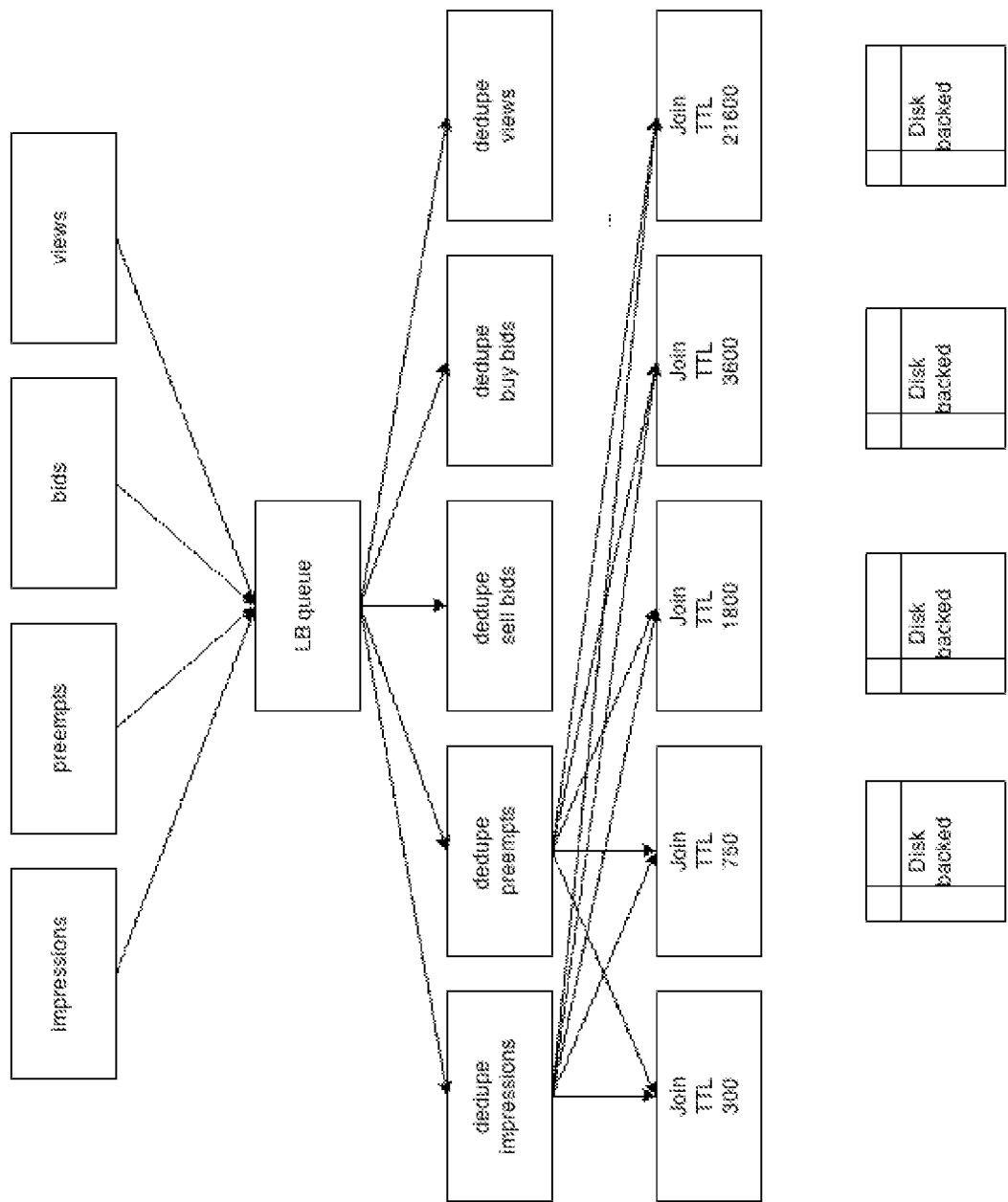
FIG. 8 depicts a logical view of real-time structured object data aggregation using join scripts according to an implementation.

The real-time transaction stream includes joined auction data from a complex event processor that provides real-time structured object data aggregation. FIG. 8 depicts a logical view of real-time structured object data aggregation using join scripts. Joined data can relate, for example, to impressions, preempts, bids, and/or views. In one implementation, these scripts perform data joining as follows.

Rows of data are received at instances of the complex event processor and are routed to a load balancing queue to enable better utilization of available processing resources. Each table is written into a de-duplication queue where the rows are de-duped based on a unique identifier (e.g., a 64-bit identifier associated with an online advertising auction). Rows that pass the dupe check (non-dupes) have their time-to-live (TTL) field read and are routed to another script layer based on the incoming TTL. Rows with the same TTL will arrive at the same TTL layer together. Each TTL script layer can have a time-limited (e.g., 300 second) in-memory join, so as to avoid writing every single row to disk. For a 300-second TTL, rows are evicted after 300 seconds and flow back to data storage. For a higher TTL threshold (e.g., 750 seconds and upwards), unjoined rows are written to disk. If a full join occurs before the TTL expires, the rows are flushed at the time of the full join. Otherwise, the rows are flushed when TTL expires. The TTLs in FIG. 8 (300, 750, 1800, and so on) are in seconds.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    determining, by a processing system including a processor, a predicted viewability of a proposed impression associated with a call for visual information and associated with a likelihood that the visual information will be viewable within a viewport of a user application, wherein the predicted viewability is assigned a value from a set of discrete viewability values;
    computing, by the processing system, a plurality of respective values for a plurality of visual information items based on the predicted viewability of the proposed impression and a respective priority for each item of the plurality of visual information items, wherein the computing of the plurality of respective values is according to each value of the set of discrete viewability values, and wherein the respective priority for each item of the plurality of visual information items represents a priority in terms of the item serving as a result relative to a pacing goal for the item for a defined time interval;
    selecting, by the processing system, in accordance with the plurality of respective values, a first item of the plurality of visual information items to be the result, wherein the selecting comprises ignoring visual information items included in the plurality of visual information items that have met their respective pacing goal for the defined time interval;
    providing the result, by the processing system, to the user application;
    directing, by the processing system, an aggregation of first data from a real-time stream of transactions with second data from one or more other streams received at a publish or subscribe and messaging queueing subsystem to generate aggregated data;
    executing, by the processing system, a control loop feedback process using at least a portion of the aggregated data to generate a pacing result; and
    applying, by the processing system, the pacing result to one or more of the plurality of respective values.

2. The method of claim 1, further comprising receiving, by the processing system, the call for the visual information to be provided to the user application.

3. The method of claim 1, further comprising receiving, by the processing system, the real-time stream of transactions.

4. The method of claim 1, further comprising directing, by the processing system, an aggregation of the second data from the one or more other streams.

5. The method of claim 4, further comprising providing, by the processing system, the pacing result and at least a portion of the second data as input to the control loop feedback process a second, later time to generate an updated pacing result.

6. The method of claim 1, further comprising providing, by the processing system, historical viewability information to a view predictor subsystem, wherein the view predictor subsystem determines the predicted viewability of the proposed impression at the likelihood that the visual information will be viewable within the viewport of the user application based on the historical viewability information.

7. The method of claim 6, further comprising tracking, by the processing system, the historical viewability information for the plurality of visual information items provided to a plurality of user applications.

8. The method of claim 1, further comprising providing, by the processing system, software code for execution on a client device and configured to determine when the visual information is viewable within the viewport of the user application.

9. The method of claim 1, wherein the visual information includes an image, a video, or a combination thereof.

10. A device, comprising
    a processing system including a processor; and
    a memory that stores executable instructions that, when executed by the processing system, facilitate performance of operations, the operations comprising:
    determining a predicted viewability of a proposed impression associated with a call for visual information and with a likelihood that the visual information will be viewable within a viewport of a user application, wherein the predicted viewability is assigned a value from a set of discrete viewability values;
    computing a plurality of respective values for a plurality of visual information items based on the predicted viewability of the proposed impression and a respective priority for each item of the plurality of visual information items, wherein the computing of the plurality of respective values is according to each value of the set of discrete viewability values;
    selecting, in accordance with the plurality of respective values, a first item of the plurality of visual information items to be a result, wherein the selecting comprises ignoring visual information items included in the plurality of visual information items that have met their respective pacing goal for a defined time interval;
    providing the result to the user application;
    directing an aggregation of first data from a real-time stream of transactions with second data from one or more other streams to generate aggregated data;
    executing a control loop feedback process using at least a portion of the aggregated data to generate a pacing result; and
    applying the pacing result to one or more of the plurality of respective values.

11. The device of claim 10, wherein the respective priority for each item of the plurality of visual information items represents a priority in terms of the item serving as the result relative to a pacing goal for the item for the defined time interval.

12. The device of claim 10, wherein the operations further comprise directing an aggregation of the second data from the one or more other streams.

13. The device of claim 12, wherein the operations further comprise providing the pacing result and at least a portion of the second data as input to the control loop feedback process at a second, later time to generate an updated pacing result.

14. The device of claim 10, wherein the operations further comprise providing historical viewability information to a view predictor subsystem, and wherein the view predictor subsystem determines the predicted viewability of the proposed impression at the likelihood that the visual information will be viewable within the viewport of the user application based on the historical viewability information.

15. The device of claim 14, wherein the operations further comprise tracking the historical viewability information for the plurality of visual information items provided to a plurality of user applications.

16. The device of claim 10, wherein the operations further comprise providing software code for execution on a client device and configured to determine when the visual information is viewable within the viewport of the user application.

17. The device of claim 10, wherein the visual information includes an image, a video, or a combination thereof.

18. A non-transitory, machine-readable medium, comprising
  executable instructions that, when executed by a processing system including a processor, facilitate performance of operations, the operations comprising:
  determining a predicted viewability of a proposed impression associated with a call for visual information and with a likelihood that the visual information will be viewable within a viewport of a user application, wherein the predicted viewability is assigned a value from a set of discrete viewability values;
  computing a plurality of respective values for a plurality of visual information items based on the predicted viewability of the proposed impression and a respective priority for each item of the plurality of visual information items, wherein the computing of the plurality of respective values is according to each value of the set of discrete viewability values;
  selecting, in accordance with the plurality of respective values, a first item of the plurality of visual information items to be a result, wherein the selecting comprises ignoring visual information items included in the plurality of visual information items that have met their respective pacing goal for a defined time interval;
  providing the result to the user application;
  executing a control loop feedback process using at least a portion of aggregated data to generate a pacing result, wherein the aggregated data comprises first data from a real-time stream of transactions with second data from one or more other streams; and
  applying the pacing result to one or more of the plurality of respective values.

19. The non-transitory, machine-readable medium of claim 18,
  wherein the operations further comprise:
  tracking historical viewability information for the plurality of visual information items provided to a plurality of user applications; and
  providing the historical viewability information to a view predictor subsystem, wherein the view predictor subsystem determines the predicted viewability of the proposed impression at the likelihood that the visual information will be viewable within the viewport of the user application based on the historical viewability information.

20. The non-transitory, machine-readable medium of claim 18,
  wherein the operations further comprise:
  directing an aggregation of the second data from the one or more other streams; and
  providing the pacing result and at least a portion of the second data as input to the control loop feedback process at a second, later time to generate an updated pacing result.

* * * * *